UNITED STATES PATENT OFFICE 2,012,962

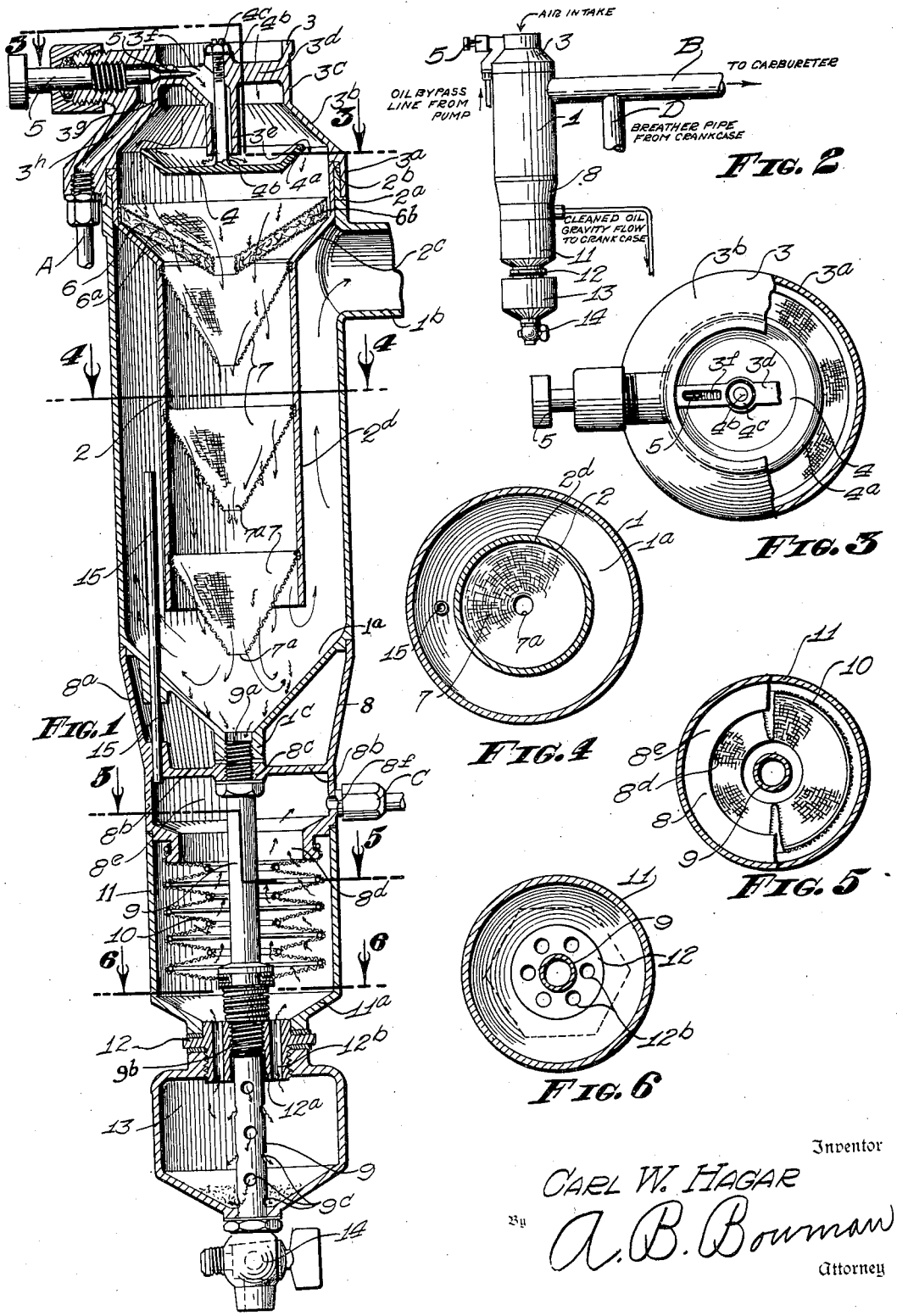

AIR CLEANER FOR INTERNAL COMBUSTION ENGINES

Carl W. Hagar, Los Angeles, Calif.

Application April 17, 1933, Serial No. 666,478

11 Claims. (Cl. 183—9)

My invention relates to air cleaners for internal combustion engines, and the objects of my invention are:

First, to provide an air cleaner of this class which utilizes the oil and oil circulating system of an engine;

Second, to provide a means for removing and collecting the deleterious matter carried by the air to an engine;

Third, to provide a cleaner of this class which not only cleans the air prior to its entering the carburetor but also thoroughly cleans the oil and returns it to the crank case of the engine;

Fourth, to provide a cleaner wherein the dust particles are enveloped by a liquid and then caused to settle entirely free and separated from the air screen; thus once the dust particles or other deleterious matter are separated from the air, they cannot be returned to the air stream even though the cleaner should become inoperative and air be caused to flow there-through without being cleaned;

Fifth, to provide a cleaner of this class wherein the resistance to air flow is minimized and remains at a minimum even though operated for long periods of time, the deleterious matter being removed as fast as it is collected so that it in no manner forms obstructions to the flow of air;

Sixth, to provide an air cleaner of this class which cools the oil as well as cleans the air thereby operating both as an air cleaner and an oil cooler;

Seventh, to provide an air cleaner of this class which operates efficiently throughout a wide range of engine speed; and Eighth, to provide on the whole a novelly constructed air cleaner for internal combustion engines which is particularly efficient in its action even under extremely adverse conditions, sturdy and compact of structure, and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application, in which, Figure 1 is a longitudinal sectional view of my air cleaner with parts and portions shown in elevation; Fig. 2 is a digrammatical view of my air cleaner showing its relation to the principal coacting portions of an internal combustion engine; Fig. 3 is a partial elevational partial sectional view through 3—3 of Fig. 1; Fig. 4 is a transverse sectional view through 4—4 of Fig. 1; Fig. 5 is another transverse sectional view through 5—5 of Fig. 1; and Fig. 6 is a transverse sectional view through 6—6 of Fig. 1.

Similar characters of reference refer to similar parts and portions throughout the several views of the drawing.

Main shell member 1, inner shell member 2, capping shell 3, atomizing dish 4, needle valve 5, primary dispersing screen 6, secondary dispersing screens 7, connecting shell 8, tube 9, filter 10, filter housing 11, coupling 12, sediment bowl 13, drain cock 14, and pressure equalizing tube 15 constitute the principal parts and portions of my air cleaner.

A main shell member 1 is provided which is relatively long and cylindrical. The shell member 1 is substantially constant in diameter except for a cone-shaped lower end portion 1a. The upper end of the shell member is open and is adapted to receive an inner shell member 2. The inner shell member 2 comprises a major diameter portion 2a of relatively short axial extent which fits snugly with the end of the upper end of the shell member 1, and is outwardly flanged as indicated by 2b so as to over-hang the upper extremity of the main shell member and be supported thereby. Below the major diametered portion 2a the inner shell member forms a frusto-conical portion 2c which joins the minor diametered cylindrical portion 2d comprising the principal extent of the inner shell member 2. The minor diametered portion 2d fits within the main shell member 1 in concentric and spaced relation therewith.

The upper end of the main shell member 1 and inner shell member 2 is closed by a capping shell 3. The capping shell 3 comprises a major diametered portion 3a which fits over the main shell member 1 in sealed relation therewith and may like-wise act to hold the inner shell member 2 in position as shown in Fig. 1. Above the major diametered portion the walls of the capping shell 3 converge forming a frusto-conical portion 3b. The upper end of the portion 3b joins a short cylindrical portion 3c or smaller diametered portion which forms the air intake of the air cleaner. The minor diametered portion 3c is bridged diametrically by a web 3d from which depends a tubular stem 3e. Positioned within the capping shell 3 and below the stem 3e is an atomizing dish 4 having a flat bottom portion and relatively low upwardly and outwardly directed sidewalls 4a. Centered in the dish 4 is a stem or rod 4b which extends upwardly through the hollow stem 3e in spaced relation to the walls thereof. The upper end of the rod 4b is screw threaded into the web 3d and is provided with a suitable lock nut 4c. The web 3d is provided with a downwardly directed and sloping passage 3f which intersects the bore of the stem 3e. The passage 3f is relatively large and is intersected near its upper portion by a meter port 3g which extends horizontally outwardly through the one end of the web 3d. The meter port 3g is controlled by a suitable meter valve 5. Along one outer wall of the capping shell 3 is a supply passage and chamber 3h which communicates with the meter port 3g, as shown best in Fig. 1. The passage 3h is connected by a suitable tubing designated A to the oil pump or analogous device associated with an internal combustion engine.

The inner shell member 2 is provided at its upper portion below the atomizing dish 4 with a primary dispersing screen 6 which comprises a pair of parallel arranged conical screen members 6a separated by a suitable filtering medium such as steel wool or the like designated 6b. The primary dispersing screen 6 is arranged with its apex pointing downwardly and in centered relation with the inner shell member 2. Below the primary dispersing screen 6 and within the minor diametered portion 2d of the inner shell member 2 are a series of secondary dispersing screens 7 which are like-wise conical in form with their apexes pointing downwardly. The inner shell member 2 is spaced upwardly from the conical lower end portion 1a of the outer shell member 1 so as to form therewith an air passage which at first extends downwardly through the capping shell 3, then through the inner shell member 2 and then upwardly between the inner and outer shell members. Near the upper portion of the outer shell member 1, said shell member is provided with an air outlet port 1b which is connected by a pipe B to the air intake of the carburetor.

The conical lower end 1a of the main shell member terminates in a depending internally threaded nipple 1c. A connecting shell member is provided which comprises a cylindrical wall 8a of various diameters and a partition 8b intermediate its ends. The partition 8b is provided with an internally threaded boss 8c which is adapted to fit in abutting relation with the nipple 1c and be secured thereto by means of an externally threaded end portion 9a of a tube 9. The portion of the connecting shell 8 above the partition 8b diverges and engages the shell member 1 at the lower extremity of the cylindrical portion. Below the partition 8b in spaced relation therewith the shell 8 is constricted forming an inlet opening 8d. The lower outer peripheral portion of the constricted inlet 8d is provided with a bead or flange which aids in the support of a filter 10. The filter 10 is in the form of a circular screen having alternately major and minor diametered portions so as to form a series of connected disk like elements and thereby increase the area thereof. By reason of the connection of the inlet 8d with the filter 10, the portion of the connecting shell 8 below the partition 8b forms with said interior of the filter a chamber 8e. Said chamber 8e is provided with an outlet port 8f disposed in its side wall a short distance below the partition 8b. The outlet 8f is connected to an oil line C which extends to the oil receiving portion of the internal combustion engine.

Surrounding the filter 10 is a filter housing 11 which is cylindrical and forms a sealed connection at its upper end with the connecting shell 8. The lower end of the housing 11 is constricted as indicated by 11a and is adapted to receive a coupling 12. The above mentioned tube 9 extends downwardly through the coupling 12 and is provided with an externally threaded portion 9b which co-acts with an internally threaded bore 12a which receives the tube 9 so that the coupling 12 may be screwed upon the tube 9, and thereby secure the housing 11 in sealed relation with itself and with the connecting shell 8. Within the housing 11, near its lower end, the filter 10 is secured in sealed relation by any suitable means to the tube 9. The filter 10 therefore forms a partition separating the chamber 8e from the interior of the housing 11.

The coupling 12 is externally threaded at its lower portion and screwably receives a sediment bowl 13. Said coupling is provided with a series of axially extending apertures 12b extending in spaced relation with the bore 12a and communicating between the sediment bowl 13 and the housing 11.

The sediment bowl 13 is constricted at its lower end so as to snugly receive the tube 9 and is large enough to contain an adequate amount of sediment. The lower end of the tube 9 and the sediment bowl 13 are joined in sealed relation with each other and with a drain cock 14. Within the sediment bowl 13 the corresponding portion of the tube 9 is provided with a plurality of apertures 9c which allow the contents of the tube 9 to discharge into the sediment bowl 13.

In order to equalize pressures in the various portions of the air cleaner there is provided a pressure equalizing tube 15 which is relatively small in diameter and extends from a point between the inner and outer shells 2 and 1 downwardly through the bottom of the shell 1 and through the partition 8b into the chamber 8e. Also, the pipe or conduit B connected with the carburetor is intersected by a breather pipe D which extends from the crank case of the engine.

Operation of my air cleaner is as follows: Worn or dirty oil from the crankcase is conducted by pressure through the tube A and metered by the valve 5 so as to discharge at a predetermined rate into the passage 3f and tube 3e and onto the dish 4. Flow of the oil from the meter valve is assisted by the incoming air which passes downwardly through the capping shell 3. The incoming air strikes the dish 4 atomizing the oil thereon and flows over the edges of the dish 4 between the walls 4a thereof and the frusto-conical portion 3b of the capping shell 3. The dish 4 is adjustable vertically so as to regulate the space between its walls 4a and the capping shell 3. Such a space is preferably smaller in area than the area of the passages above and below the dish 4 so that the lowered pressure at this point aids in mixing the air and oil. The mixed air and oil pass through the primary dispersing screen 6, and are more thoroughly mixed so that the particles of deleterious matter become coated with the oil and increase their weight until they can no longer be carried by the air screen. The mixing operation continues as the oil and air pass downwardly through the secondary dispersing screens 7. The air after issuing from the inner shell 2 passes upwardly between the inner and outer shells 2 and 1. The space between the shells is greater in area than the area of the inner shell 2 so that the pressure is greater therein than within the inner shell. This difference of pressure aids in the depositing of the oil particles and deleterious matter upon the conical lower end 1a of the outer shell 1. From here the oil and deleterious matter drain into the tube 9 and flow downwardly there-through into the sediment bowl 13. The bowl 13 is of such size and the flow of oil is of such low velocity that a large percentage of the deleterious matter settles out of the oil. The partially cleaned oil flows upwardly through the passages 12b and into the housing 11, then through the filter 10 into the chamber 8e, the filter 10 removing the last traces of deleterious matter. The flow of oil, the size of ports through which is passes, and the nature of the filter 10 is such that very little pressure difference is required to enable the level of the oil in the chamber 8c to rise sufficiently to flow out of the outlet line C. From the line C the oil flows by gravity back to the engine.

The equalizer pipe 15 tends to maintain the pressure in the chamber 8e equal to the pressure in the air passage between the outer and inner shells 1 and 2, thus preventing any back flow of the oil through the pipe 9 as would be the case if the pressure in the chamber 8e were allowed to exceed that in the air passage. Also, the breather pipe D of the crankcase is connected with the air pipe B for subjecting the crankcase to pressure similar to that in the chamber 8e and air passages so that the oil will readily flow through the return line C. The connection of the breather pipe with the air supply line also removes the combustible vapors of the heated oil which would otherwise be wasted utilizing them with the gas mixture.

The oil and air mixing means of the air cleaner functions as an exchanger; that is, deleterious matter in the air is transferred to the oil and heat from the oil is transferred to the air.

It should be here noted that only a relatively small quantity of oil is required to cause proper action of the air cleaner, although a considerable quantity may be passed through particularly when the conditions of operation require impetus on the oil cooling features of the device. Because of the relatively small quantity of oil required, it is preferred to connect the tube A with the line leading from the oil pump to the oil pressure gauge, this being the line usually connected with the conventional oil filters or the like. In any case, only part of the oil from the pump is passed through the air cleaner and the metering valve 5 is so arranged that the desired pressure in the oil supplying portion of the oil system may be maintained at the desired value.

By reason of the sump or settling chamber being interposed before the filter a large percentage of the deleterious matter is settled out of the oil so that the work of the filter is reduced and the pressure required for its operation is likewise reduced, thus permitting the gravity feed of the oil back to the crankcase.

Also, it is preferred to provide at the apexes of the dispersing members 6 and 7, apertures 6a and 7a, respectively. These apertures create a certain lateral flow of the oil and air along the surfaces of the dispersing members as well as setting up eddy currents which aid in the proper mixing of the air and oil. The apertures also permit the passing of accumulated balled masses of deleterious matter, such masses having a tendency to form when the deleterious matter is extremely fine and plentiful.

It should be here noted that dish 4 functions in two different manners. When the air velocity through the cleaner is high as when the carburetor throttle is open, the flow of air draws off the oil from the dish 4 as fast as it accumulates causing the dish to function principally as an atomizing means and mix the oil with the air. When the air velocity is low oil accumulates on the tray or dish and is spilled therefrom by vibration of the engine, jolts, etc. At low air speeds the spilling of oil from the tray or dish maintains the screens sufficiently oiled to enable them to collect deleterious matter from the air. A sudden increased air velocity as occasioned by acceleration of the engine draws off the accumulated oil causing it to wash any collected deleterious matter from the dispersing screens.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In an air cleaner for internal combustion engines, an air circulating means, an oil circulating means, said means having a common passage and an instrumentality in said passage for producing an intimate mixture of the oil and air whereby the deleterious matter carried by the air is coated by the oil and its mass increased until the deleterious matter falls from the air stream, a collector for the oil coated deleterious matter also connected with both the air and oil circulating means, a sump forming a portion of said oil circulating means disposed clear of said air circulating means and adapted to receive the oil and deleterious matter from said collector, and a filter forming a link in said oil circulating means subsequent to said sump.

2. In an air cleaner for an internal combustion engine wherein there is a carburetor air intake and an oil line of the engine oil circulating system, the combination with said carburetor air intake and engine oil line of an exchanger including an air passage connected with the carburetor air intake, an oil passage common in part with the said air passage interposed in said oil line, means for mixing the air and oil whereby deleterious matter in the air is transferred to the oil and heat from the oil is absorbed by the air, and a collector for the cooled oil and deleterious matter, a settling chamber also interposed in said oil line and in communication with said collector but separated from said air passage, and a filter means subsequent to said settling chamber.

3. In an air cleaner for an internal combustion engine wherein there is a carburetor air intake and an engine oil supplying means, the combination with said carburetor air intake and engine oil supplying means, an exchanger including an air inlet, a down passage leading therefrom, an up passage continuing from said down passage and connected with said carburetor intake, means connected in said oil supplying means for introducing oil at the upper portion of said down passage, means in said down passage for mixing the air and oil whereby the deleterious matter in the air is transferred to the oil and the heat from the oil is absorbed by the air, a settling chamber arranged to receive the cooled oil and deleterious matter from said exchanger, said settling chamber disposed clear and free of the air passages therein, and a filter connected with the discharge end of said settling chamber, said settling chamber and filter interposed with said exchanger in said oil supplying means.

4. In a combination air and oil cleaner and oil cooler, means for mixing air to be delivered to an internal combustion engine and a portion of the oil of its oil circulating system, whereby deleterious matter in the air is transferred to the oil and heat from the oil is absorbed by the air, a settling chamber arranged to receive the cooled oil and deleterious matter from said means, a filter connected with the discharge end of said settling chamber, and means for returning oil from said filter to the oil circulating system of said engine.

5. In an air cleaner for internal combustion engines, an exchanger connected with the carburetor intake and oil circulating system of an internal combustion engine, said exchanger adapted to mix oil and air whereby deleterious matter is transferred from the air to the oil, a drain tube leading downwardly from said exchanger arranged to receive the oil and deleterious matter and remove the same from the exchanger, a settling chamber at the lower end of said drain tube, a filter unit surrounding said drain tube above said settling chamber comprising an inlet portion adapted to receive oil upwelling from said settling chamber, a filter element, and an outlet portion in communication with the oil system of the engine, the outlet of said filter unit being below the oil level maintained in said drain tube whereby the oil flows there-through without initial pressure in said exchanger.

6. In an air cleaner for internal combustion engines, a casing defining a down-passage, and a concentrically disposed up-passage communicating at their lower ends, the passages being elongated, an air inlet at the top of the down-passage, an air outlet at the top of the up-passage, a collecting means at the bottom ends of said passages arranged to receive the cleansing fluid and deleterious matter carried thereby, a drain pipe leading from the collecting means for removing the cleansing fluid and deleterious matter therefrom, a sump at the end of said drain pipe, and means for passing the cleansing fluid from the sump back to said cleansing fluid inlet.

7. In an air cleaner for internal combustion engines, a casing defining a down-passage, an up-passage, and a communicating chamber connecting the lower ends of the passages, the up-passage being larger than the down passage whereby the dynamic pressure of air flowing therethrough is greater in the up-passage and a down pressure is exerted on the lower wall of the communicating chamber, means for introducing a cleansing fluid in the upper end of the down-passage, mixing means in said down-passage for mixing the air with cleansing fluid to effect transfer of deleterious matter thereto, a collecting means formed by the lower wall of the communicating chamber and a discharge pipe therefor for draining the cleansing fluid and deleterious matter from the air stream.

8. In an air cleaner for internal combustion engines, a casing defining a down-passage, an up-passage, and a communicating chamber connecting the lower ends of the passages, the up-passage being larger than the down passage whereby the dynamic pressure of air flowing therethrough is greater in the up-passage and a down pressure is exerted on the lower wall of the communicating chamber, means for introducing a cleansing fluid in the upper end of the down-passage, mixing means in said down-passage for mixing the air with cleansing fluid to effect transfer of deleterious matter thereto, a collecting means formed by the lower wall of the communicating chamber and a discharge pipe therefor for draining the cleansing fluid and deleterious matter from the air stream, a sump and settling chamber at the remote end of the discharge pipe, and means for passing cleansing fluid therefrom to the introducing means therefor.

9. In an air cleaner for internal combustion engines, a casing defining a down-passage, an up-passage, and a communicating chamber connecting the lower ends of the passages, the up-passage being larger than the down passage whereby the dynamic pressure of air flowing therethrough is greater in the up-passage and a down pressure is exerted on the lower wall of the communicating chamber, means for introducing a cleansing fluid into the upper end of the down-passage, a plurality of spaced apart mixing elements mounted in said down-passage to mix the air and cleansing fluid whereby deleterious matter is transferred to the cleansing fluid, a collecting means formed by the lower wall of the communicating chamber and a discharge pipe therefor for draining the cleansing fluid and deleterious matter from the air stream.

10. In an air cleaner for internal combustion engines, a casing defining a down-passage, an up-passage, and a communicating chamber connecting the lower ends of the passages, the up-passage being larger than the down passage whereby the dynamic pressure of air flowing therethrough is greater in the up-passage and a down pressure is exerted on the lower wall of the communicating chamber, means for introducing a cleansing fluid into the upper end of the down-passage including a tray arranged to receive and collect cleansing fluid, said tray restricting the down-passage whereby the flow of air tends to draw the cleansing fluid from the tray in proportion to the quantity of air passing therethrough, and a plurality of spaced apart mixing elements mounted in said down-passage to mix the air and cleansing fluid whereby deleterious matter is transferred to the cleansing fluid, a collecting means formed by the lower wall of the communicating chamber and a discharge pipe therefor for draining the cleansing fluid and deleterious matter from the air stream.

11. In an air cleaner for internal combustion engines, a casing defining a down-passage, an up-passage, and a communicating chamber connecting the lower ends of the passages, the up-passage being larger than the down-passage whereby the dynamic pressure of air flowing therethrough is greater in the up-passage and a down pressure is exerted on the lower wall of the communicating chamber, means for introducing a cleansing fluid into the upper end of the down-passage including a tray arranged to receive and collect cleansing fluid, said tray restricting the down-passage whereby the flow of air tends to draw the cleansing fluid from the tray in proportion to the quantity of air passing therethrough, and a plurality of spaced apart mixing elements mounted in said down-passage to mix the air and cleansing fluid whereby deleterious matter is transferred to the cleansing fluid, a collecting means formed by the lower wall of the communicating chamber and a discharge pipe therefor for draining the cleansing fluid and deleterious matter from the air stream, a sump and settling chamber at the remote end of the discharge pipe, and means for passing cleansing fluid therefrom to the introducing means therefor.

CARL W. HAGAR.